United States Patent Office 3,562,804
Patented Feb. 9, 1971

3,562,804
LOW BULK VISCOSITY MASTIC COMPOSITIONS AND PROCESS FOR PREPARING SAME
Kenneth W. Powers, Berkeley Heights, N.J., assignor to Esso Research and Engineering Company, a corporation of Delaware
No Drawing. Continuation-in-part of application Ser. No. 550,649, May 17, 1966. This application Aug. 19, 1968, Ser. No. 753,700
Int. Cl. C08d 3/04
U.S. Cl. 260—85.3
13 Claims

ABSTRACT OF THE DISCLOSURE

Low bulk viscosity (room temperature flowable) polyisobutylene backbone type mastic compositions which are curable to solid elastomeric vulcanizates are formed by the reaction of $C_4$ to $C_6$ conjugated diolefins with a major portion of isoolefin in the presence of a catalyst system comprising an ethyl aluminum dichloride with a halogenated organic promoter, preferably benzyl chloride.

CROSS-REFERENCES TO RELATED APPLICATIONS

This application is a continuation-in-part of Ser. No. 550,649 filed May 17, 1966 by the same inventor.

BACKGROUND OF THE INVENTION

The preparation of polymers and halogen-substituted polymers that contain minor amounts of unsaturation and are elastomers has been widely reported in the prior art. Typically, the chlorination of copolymers that contain about 85 to 99.5% of a $C_4$-$C_7$ isoolefin such as isobutylene with about 15 to 0.5% of a multiolefin of about 4 to 14 carbon atoms is reported in U.S. Pat. 2,944,578. However, the elastomers and halogenated elastomers disclosed in the art are high molecular weight, high bulk-viscosity, solid rubbery substances useful in the formation of tire bodies and the like. While high molecular weight materials are well suited for the manufacture of heavy duty goods, such materials are unsuitable as the base composition for mastics, caulking compounds, etc.

The adhesives and sealants (mastics) market is projected to grow at a very healthy 10%! a year. Many industries have now developed a demand for high performance sealants. For instance, in the building industry there is increasing use of mastics in curtain wall construction. Automobile manufacturers are gradually changing their requirements from dry rubber gaskets to gunnable sealants and tape systems. Thus, the increased sophistication in these major industries have accelerated demand and stimulated the development of high performance mastic materials to be used for sealants and adhesives.

SUMMARY OF THE INVENTION

The present invention relates to low molecular weight, low bulk-viscosity halogenated and nonhalogenated polymer compositions, cured mastic compositions formed from said polymers, and to a process for the formation of the polymers. More particularly, the present invention is directed to halogenated and nonhalogenated low molecular weight, low-bulk viscosity, room temperature flowable polymer compositions that have very narrowly defined molecular weight and bulk viscosity relationships, cured elastomeric vulcanizates formed from said polymers and to a low temperature process for the formation of the polymers.

Now, in accordance with the present invention, it has been found that room temperature flowable (low-bulk viscosity), low molecular weight, halogenated and nonhalogenated polymer compositions that can be readily crosslinked to elastomeric vulcanizates can be formed by the reaction of an isoolefin with a conjugated diolefin in a hydrocarbon diluent with a promoted or unpromoted aluminum compound based catalyst system. The reaction is suitably conducted at reduced polymerization temperatures and moderate polymerization pressures. The products of this invention are characterized by a relatively low degree of unsaturation and a particular bulk viscosity-viscosity average molecular weight relationship which latter accounts for their flowability at moderate temperatures. Utilizing alternate means of characterization, the products exhibit an extremely narrow molecular weight distribution. The products of this invention can be readily crosslinked using conventional techniques and find utility in the formation of a wide variety of coated and molded articles, mastics, sealants, caulking compounds, etc. They can be used as surface coatings, i.e. for coating cans.

DETAILED DESCRIPTIONS WITH PREFERRED EMBODIMENTS

The polymers encompassed by the present invention are formed from isoolefins and $C_4$-$C_6$ aliphatic, conjugated diolefins. Representative examples of useful conjugated diolefins include: isoprene, 1,3-butadiene, 2,3-dimethylbutadiene, piperylene, cyclopentadiene, etc. The isoolefin component of the polymer system has from 4 to 15 carbon atoms, preferably from 4 to 9 carbon atoms. Useful olefins are typically denominated as Type III olefins and have the general formula:

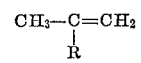

wherein R is an acyclic or alicyclic having from 1 to 12 carbon atoms, preferably an alkyl radical having from 1 to 6 carbon atoms. The preferred isoolefin for use in the formation of the polymers of this invention is isobutylene.

Useful polymer compositions include copolymers which contain about 70 to 99.5 mole percent, preferably 90 to 99.5 mole percent of the isoolefin such as isobutylene with about 30 to 0.5 mole percent, preferably from about 10 to 0.5, and most preferably 3 to 0.5 mole percent of a conjugated diolefin such as isoprene. High molecular weight solid polymers with the minimum range degree of unsaturation are commonly referred to in the art as "Butyl rubber."

In contrast, the polymers of this invention exhibit iodine numbers (Cg $I_2$/gram of polymer) of from 20 to 35; bulk viscosities at 200° F. varying from 10,000 to 600,000 centipoises, preferably from 10,000 to 200,000 centipoises; viscosity average molecular weight ($M_v$) as determined in diisobutylene at a polymer concentration of 5 mg./ml. at 20° C. of at least 10,000 up to 50,000, preferably 15,000 to 45,000 and most preferably, from 20,000 to 40,000; a narrow molecular weight distribution wherein the ratio of weight average molecular weight ($\overline{M}_w$) to number average molecular weight ($\overline{M}_n$), i.e. $\overline{M}_w/\overline{M}_n$ ratio as determined by gel permeation chromatography (GPC) using polystyrene as a reference of less than 2.5, preferably less than 2.0; and a number average molecular weight ($\overline{M}_n$) as calculated from GPC data of at least 10,000, and as much as 30,000. Because of the copolymer's narrow molecular weight distribution, the materials have relatively low viscosities and are flowable at moderate temperatures. Similarly, because the materials exhibit relatively high values of $\overline{M}_n$, the polymers can be crosslinked to vulcanizates having tensile strengths in excess of 1000 p.s.i. The gel permeation chromatography test used to determine the value of $\overline{M}_n$ and the ratio of $\overline{M}_w$ to $\overline{M}_n$ of the copolymer products has been widely discribed in the literature.

For example, J. C. Moore, J. Poly. Sci. Part A2, 835–843 (1964), J. G. Hendrickson and J. C. Moore, J. Poly. Sci. Part AI4, 167–188 (1966), P. I. Brewer, Polymer (British) 6, 603–613 (1965) and G. Meyerhof, Makromolecular Chem. A9, 282–284 (1965) report the use of gel permeation chromatography as a polymer analysis technique.

The rheology of the polymers of the invention can be firmly described in terms of the various viscosities and molecular weight determinations which can be performed on the polymers. Thus, the room temperature flowable characteristics of the polymer are fully described by any one of the following combinations of viscosities and molecular weights. These are:

(1) Bulk viscosity plus $\overline{M}_w/\overline{M}_n$
(2) Bulk viscosity plus $\overline{M}_v$
(3) $M_v$ plus $\overline{M}_w/\overline{M}_n$ Under given circumstances, any one of these combinations of measurements can adequately describe the unique room temperature flowable polymer of the invention. Nevertheless, as those skilled in the polymer art will appreciate, molecular weight determinations are sometimes difficult to ascertain and erratic in view of the fact that sometimes there are particular molecules present which are abnormally long or short compared to the mass of the other molecules and therefore cause distorted determinations.

It is recognized in the art that at least three different molecular weight determinations can be used. These are: viscosity average which is expressed as $\overline{M}_v$; number average which is expressed as $\overline{M}_n$ and weight average which is expressed as $\overline{M}_w$. Of these the $\overline{M}_w$ and the $\overline{M}_n$ are relatively more difficult to ascertain.

Thus, bulk viscosities in centipoises and viscosity average molecular weights are the easiest determinations to make and therefore will usually be the more accurate. Therefore, it is preferred to characterize the flow characteristics of the unique polymer of this invention in terms of the bulk viscosity plus the viscosity average molecular weight. Techniques one and three described above can also be used but can be subject to some distortion depending on the skill of the analyst and the sophistication of the equipment and technique used.

The present polymerization process is preferably carried out by introducing the polymerization monomers and diluent in a liquid state into a well-stirred, tank-type reactor or high-velocity back-mixed tubular reactor. The diluent used must be capable of solubilizing the polymerization catalyst and be inert during the reaction. Useful solvents include saturated straight chain, branched chain and cyclic aliphatic hydrocarbons having from 3 to 8 carbon atoms. Liquid propane is particularly preferred, since it permits operation of a unique slurry system whereby agglomeration is minimized and heat transfer is maximized. Aromatic materials such as benzene and toluene can be used; however, the conditions of polymerization must be carefully controlled to prevent the alkylation of the aromatic diluent. During polymerization, sufficient amounts of diluent are maintained in the reaction vessel such that from 0.5 to 20 volumes, preferably 1 to 10 volumes of solvent are present for every volume of polymer and unreacted monomer.

The catalyst system employed in preparing the polymers of this invention comprises a promoted or unpromoted aluminum compound. High yields of polymer product are secured with the use of either aluminum bromide alone or ethyl aluminum dichloride promoted with hydrogen chloride or a $C_3$–$C_7$ organic halide compound. Representative examples of useful organic halide promoters for ethyl aluminum dichloride include benzyl chloride, benzyl bromide, allyl chloride, isoprene hydrochloride, methallyl chloride, t-butyl bromide, t-butyl chloride, secondary butyl-bromide, secondory-butyl chloride, etc. Benzyl chloride is the preferred promoter for ethyl aluminum dichloride. When the ethyl aluminum dichloride-organic halide catalyst system is used, generally from 96 to 99.5 wt. percent of the catalyst system is made up of ethyl aluminum dichloride and from 0.5 to 4 wt. percent of the total system made up of the organic halide promoter. However, when hydrogen chloride is used as the promoter up to 50 wt. percent of the total catalyst system may be made up of hydrogen chloride.

The concentration of catalyst present in the reaction zone can vary over a wide range. The amount of catalyst used must be sufficient to convert from 85 to 100 wt. percent of the isoolefin component of the monomer mixture thereby insuring that polymers having a narrow molecular weight distribution will be secured. Typically, in the case of either the aluminum bromide catalyst system or the ethyl aluminum dichloride-organic halide catalyst system, from 0.7 to 1.5 wt. percent of catalyst based upon total monomers is used. In polymerizations wherein the ethyl aluminum dichloride-HCl catalyst system is employed, smaller amounts of catalyst can be used and catalyst concentrations within the reaction zone varying from about 0.10 to 0.3 wt. percent, based upon monomers is sufficient to secure high yields of desirable polymers.

The conditions at which the polymerization reaction is conducted can vary over a wide range. Generally, temperatures ranging from about $-30$ to $-80°$ C. can be used; however, temperatures ranging from $-40$ to $-60°$ C. are preferred. The pressure at which the polymerization is carried out is not critical provided that the polymerization monomers and solvents are maintained in the liquid state. Pressures ranging from about 1 to 10 atmospheres, preferably from 1 to 5 atmospheres, can be used. In most industrial applications, the pressure within the polymerization reaction zone will be the autogenous pressure exerted by the reactants, e.g. the isoolefin and diolefin and/or the solvent. The reaction time used in the formation of the preferred polymers of this invention is not critical; however, sufficient time should be allowed for the desired monomer conversion which depends upon temperature, monomer concentration, activity of the particular catalyst combination used, etc. In general, high yields of the low bulk-viscosity copolymer products of this invention are obtained within the temperature and pressure limits set forth above within from 5 minutes to 2 hours.

Either tank-type reactors provided with high velocity turbines for obtaining good mixing of the reaction monomers and diluent or back-mixed tubular reactors wherein turbulent flow is maintained may be employed. The reactor may be constructed of any material that is inert to the reactants and catalyst used and is capable of withstanding the operating pressures. Reaction vessels made of glass, alloys and glass-lined steel are satisfactory.

In a typical polymerization procedure according to this invention, liquefied isoolefin and diolefin monomers are mixed with a hydrocarbon diluent and fed continuosly into the polymerization reactor. The catalyst components are continuously introduced into the reaction mixture during the addition of the polymerization monomers. The isoolefin and diolefin contained in the hydrocarbon diluent are permitted to react under constant stirring for a sufficient residence time to secure a substantial conversion of the monomers.

Following reaction, the polymer cement that contains from 5 to 60 wt. percent polymer is quenched with alcohol and then further processed to recover the polymer formed or passed to a halogenation operation.

In operations wherein the polymeric material is not subsequently halogenated, the quenched polymer cement exiting from the reactor is washed with an equal volume of water containing a minor amount of either hydrochloric or sulphuric acid. Following the washing stage, a stabilizer or antioxidant is added to the polymer and the total mixture passed to a stripper, preferably a wiped film evaporator where the solvent and unreacted monomers are removed and the fluid polymer recovered. In the formation of halogenated polymers, the quenched polymer cement from the reactor is partially stripped to remove unreacted monomers and the cement passed to the halogenation zone.

According to the present invention, the hereinbefore described low bulk viscosity (flowable) copolymers can be chlorinated or brominated to render the polymers more amenable to subsequent curing operations. Preferably, the halogenated polymers contain either from 1 to 7 wt. percent, more preferably from 2 to 5 wt. percent of chlorine or from 2 to 14 wt. percent, more preferably 4 to 10 wt. percent bromine. Alternatively, mixed chloro or bromo derivatives may be used. Polymer compositions having from 1 to 14 wt. percent of chemically combined halogen can be readily cured or crosslinked at moderate temperatures.

Suitable brominating and chlorinating agents which may be employed are molecular chlorine and bromine, alkaline metal hypohalides (preferably sodium hypochloride or sodium hypobromide), sulfur halides (particularly oxygenated sulfur chlorides and bromides), pyridinium chloride, tertiary butyl hypochlorite, N-bromosuccinimide, alpha-chloroacetoacetanilide, N-bromoacetamide, and other common chlorinating and brominating agents. Preferred halogenated agents are molecular bromine and chlorine and sulfuryl chloride and bromide. The halogenation is advantageously conducted to about 0 to 100° C., preferably at about 20 to 80° C., for about 1 minute to several hours. However, the temperatures and times are regulated to halogenate the low bulk viscosity polymers to the extent above-mentioned.

The halogenation may be accomplished in various ways. One process comprises taking a monomer-free polymer solution from the polymer reaction zone or preparing a solution of the low-molecular weight polymer as above in a suitable inert liquid organic solvent such as inert hydrocarbons or inert halogenated hydrocarbons and then contacting the polymer with the halogenating agents. Examples of useful solvents include hexane, heptane, chlorobenzene, chloroform, trichloroethane, carbon tetrachloride, etc. Other variations involve chlorinating or brominating with gaseous chlorine or bromine contained in a carrier gas such as nitrogen. With this technique a polymer solution is contacted with the gaseous halogen. The use of elevated or depressed pressures during halogenation is optional. However, the reaction pressure used can vary with reaction temperatures. A preferred method of conducting the halogenation reaction is to contact the cement from the polymerization reactor freed of catalyst and unreacted monomers with gaseous chlorine at about 60° C. until the desired amount of chlorine has been taken up.

The halogenated and nonhalogenated polymer products may, prior to curing or crosslinking, be compounded with minor amounts of various types of stabilizers and/or antioxidants and up to major amounts of fillers and extender oils. Typical stabilizers useful in preventing decomposition or the discoloration of the polymer product include various types of epoxides, amines, organo tin compounds, metal salts, etc. Specifically, stabilizers that are highly effective in concentrations of about 0.2 part of stabilizer per 100 parts of polymer include $PbHPO_3$, tributyl amine, tetramethylthiuramdisulfide, butanediol diglycidylether, di-o-tolylguanadine, as well as various types of epoxidized soya and soybean oils.

Fillers such as carbon black, petroleum coke or mineral fillers may be incorporated into the polymer up to about 10 parts, preferably up to 200 parts of filler per 100 parts of polymer. Among the carbon blacks that may be compounded with either the halogenated or nonhalogenated polymer products are the channel blacks such as EPC, MPC, HPC, etc. (these letters denoting carbon black products well known to the trade), the furnace blacks including SRF, HAF, etc. and the thermal blacks. The mineral fillers which may be used include any of the usual black fillers or pigments such as the oxides, hydroxides, sulfides, carbonates, and so forth of silicon, aluminum, magnesium, titanium, zinc or the like, or the silicates or aluminates of the various elements above-indicated.

Curing agents for crosslinking the nonhalogenated low bulk-viscosity polymers of this invention include quinone dioximes, dinitroso compounds, sulfur and sulfur donors. Curing may be effected at temperatures ranging from ambient to 400° F. but lower temperatures of from 60 to 210° F. are preferred. Accelerators for effecting the cure at lower temperatures include thiurams, dithiocarbamates, thiazoles, zinc oxides, lead oxides, chloranil, chloramine T, dichloramine T, triethanol amine, etc. Promoted quinonedioxime systems are particularly effective in yielding good cures within 1 day at room temperature.

Curing agents for crosslinking the low bulk viscosity halogenated polymers of this invention may be selected from polyamines, polyfunctional phenols, quinones, polymercaptans, dialkyl-tin compounds, thioureas, certain metal halides and halogen containing compounds. Curing may be effected at temperatures ranging from ambient temperatures to as high as 400° F. but lower temperatures varying from 60 to 210° F. are preferred. Accelerators for effecting cure at lower temperatures may be used. Operable accelerators include various metallic oxides and halides such as zinc oxide, zinc chloride, zinc bromide, stannous chloride, boron chloride, stannic chloride, etc.

Curing agents which effect substantial crosslinking at room temperature in periods of less than one day include dithioterephthalic acid, dibutyltin sulfide and dioctyltin sulfide. Other curing agents that are effective at temperatures below 250° F. for reaction periods of one hour or less include stannous octoate, stannous chloride, zinc chloride, zinc bromide and dibutyl thiourea. Other curing agents which effect a complete cure in periods varying from 2 to 5 hours at temperatures below 250° F. are triethylene tetra-amine, tetraethylene penta-amine, 1,12-diaminododecane, 1,9-di-aminononane, pyrogallol, phloroglucinol, 1,4-butane dithiol, thiourea, and metaphenylenebis-maleimide. Other curing agents which have been found to be effective are ethylene trithiocarbonate promoted with acidic metal halides such as stannous chloride or butyl tin chloride, dimercaptans such as 1,4-butanedithiol promoted with stannous chloride, stannic chloride or butyl tin trichloride, oxydibenzylmercaptan, zinc trimethylene-dimercaptide, glycol mercaptoacetates, and trithiocyanuric acid.

The preparation, properties, compounding, vulcanization and use of the halogenated and nonhalogenated low bulk-viscosity polymers of this invention are more fully set forth in the following examples.

Example 1

A series of feed streams were prepared and injected into a well-stirred tank type reactor. The first stream consisted of 76.9 wt. percent isobutylene, 6.6 wt. percent isoprene and 16.5 wt. percent hexane. The second stream consisted of 0.05 wt. percent benzyl chloride and 99.95% hexane. The third stream consisted of pure hexane. Each of the feed streams were chilled to a temperature of −60° F., blended together and continuously introduced into the reactor. A fourth stream consisting of 2 wt. percent ethylene aluminum dichloride and 98 wt. percent hexane was chilled to a temperature of −60° F. and continuously injected into the reactor through a separate nozzle. The temperature of the reactor and its contents were maintained constant at about −55° C. by circulating refrigerant through a jacket positioned at the outer periphery of the reactor and through a cooling coil maintained inside the reactor. The rate of introduction of the feed streams was adjusted so that a 20-minute residence time was provided in the reactor.

The stream exiting from the reactor was contacted with an isopropyl alcohol quench stream to destroy residual catalyst. The feed and catalyst introduction rates were adjusted such that the following conditions prevailed when the reaction reached steady state conditions.

TABLE I

| | Flow rate in (lb./hr.) | Converted to polymer (lb./hr.) | Flow rate out (lb./hr.) |
|---|---|---|---|
| Isobutylene | 50.0 | 47.5 | 2.5 |
| Isoprene | 4.25 | 2.55 | 1.70 |
| Hexane | 82.2 | | 82.2 |
| EtAlCl$_2$ | 0.55 | | |
| Benzyl chloride | 0.0098 | | |
| Polymer | | | 50.05 |

At steady state conditions, the effluent cement contained about 36.5 wt. percent copolymer and about 95 wt. percent of isobutylene and 60 wt. percent of the isoprene introduced into the reactor was converted to polymer. The catalyst efficiency of the reaction (grams of polymer per gram of ethylene aluminum dichloride) was 91.

A portion of the effluent cement was quenched, then washed with an equal volume of a 1% aqueous solution of hydrochloride acid. The washed polymer was then admixed with 0.2 wt. percent of 2,6-ditertiary butyl paracresol (based on solvent-free polymer) and the hexane diluent stripped from the cement under reduced pressure conditions. The resulting low bulk viscosity copolymer had a viscosity average molecular weight as determined in diisobutylene at a polymer concentration of 5 mg./ml. at 20° C. of 33,000; an iodine number as determined by the I$_2$-Mercuric Acetate method of 27.7, an isoprene content of 4.1 mole percent (5.0 wt. percent); a bulk viscosity at 200° F. of 300,000 centipoises; a $\overline{M}_w/\overline{M}_n$ ratio as determined by gel permeation chromatography of 2.0.

The gel permeation chromatography test was conducted with a Waters Gel Permeation Chromatograph with four four-foot columns in series, each packed with lightly crosslinked (with divinylbenzene) polystyrene gels. The gels contained in the first column had an average pore size of $10^6$ A., the gels of column 2 had an average pore size of $10^5$ A., the gels contained in column 3 had an average pore size of $10^4$ A., and the gels contained in column 4 had an average pore size of $10^2$ A. Each of the gel permeation tests were conducted at a temperature of 135° C. with a 100-second injection time using a 0.5 wt. percent polymer solution in trichlorobenzene.

The low bulk viscosity polymer was then compounded with carbon black, extender oils and curatives in a Banbury. Portions of the resulting mixture were then cured using conventional techniques at the conditions set forth in Table II below and the vulcanizates thereafter tested for tensile and elongation properties. The results of the tests are set forth in Table II below.

TABLE II

| Run | 1 | 2 |
|---|---|---|
| Polymer | 100 | 100 |
| SRF black | 50 | 50 |
| Flexon 845 oil [a] | 25 | 25 |
| ZnO | 5 | 5 |
| Stearic acid | 1.5 | 1.5 |
| GMF/Isothan DL (3/2 paste) [b] | 5.0 | 5.0 |
| PbO$^2$/Isothan DL (3/2 paste) | 13.0 | 13.0 |
| Cure time | (c) | (d) |
| Cure temperature | Room | (e) |
| Tensile, p.s.i. | 110 | 300 |
| Elongation, percent | 400 | 300 |

[a] Paraffinic-base oil—150 SSU at 100° F.
[b] GMF=p-quinonedioxime; Isothan DL=dialkyldimethyl ammonium bromide.
[c] 1 day. [d] 15 minutes. [e] 195 degrees Fahrenheit.

Example 2

A low bulk viscosity copolymer of isobutylene and isoprene was prepared according to the procedureof Example 1 with the exception that only 1 wt. percent of benzyl chloride based on ethyl aluminum dichloride was used. The percent monomer conversion of the run was 90%. A portion of the quenched effluent cement from the reactor was placed in a batch stripper and heated to flash off unreacted monomers. Distillation was conducted with moderate reflux until an overhead vapor temperature of 65° C. was obtained. The last distillate taken from the stripper exhibited a bromine number of less than 1, indicating that the remaining cement was substantially free of unreacted monomers.

The stripped cement containing 60% nonvolatile matter was charged to a 5-liter, well-stirred, baffled resin flask maintained at a temperature between about 20 and 25° C. Water was then added to the reactor in an amount sufficient to yield a concentration of about 0.5 wt. percent water based on cement. The contents of the flask were then purged with nitrogen and gaseous chlorine bubbled through the cement by introducing the chlorine through a sparger positioned beneath the upper surface of the cement. Chlorine introduction was continued for about one hour and the total chlorine input was about 1.25 moles of chlorine per mole of polymer unsaturation present in the cement.

The chlorinated cement was then washed with a caustic solution until the washings were basic and then further water washed to neutrality. To the washed cement was then added 0.2 wt. percent tetramethylthiuram disulfide (based on polymer) and 0.2 wt. percent of 2,6-ditertiary butyl paracresol (based on polymer). The chlorinated polymer was recovered by evaporating the hexane solvent from the cement under reduced pressure conditions. The polymer product was then tested using the same analytical techniques as were used in Example 1. The polymer exhibited a viscosity average molecular weight of 35,850; 3.42 wt. percent chlorine; iodine number before chlorination of 29.9; iodine number after chlorination of 12.5; a bulk viscosity at 205° F. of 340,000 centipoises; a $\overline{M}_w/\overline{M}_n$ ratio as determined by gel permeation chromatography of 2.4; and an isoprene content of 4.4 mole percent (5.4 wt. percent).

The halogenated polymer composition was then compounded with carbon black and curatives in a Banbury and cured into standard pads using conventional techniques. The pads were then tested for tensile strength and elongation. The results of the tests are set forth in Table III below.

TABLE III

| Run | 1 | 2 | 3 | 4 |
|---|---|---|---|---|
| Low bulk viscosity chlorinated polymer (parts by wt.) | 100 | 100 | 100 | 100 |
| SRF black | 50 | 50 | 50 | 50 |
| Oxydlbenzyl mercaptan | 9 | 9 | | |
| Dibutyl tin sulfide | | | 6 | 6 |
| SnCl$_2$·2H$_2$ at 75% dispersion in white mineral oil | 5 | 5 | 5 | 5 |
| Cured—days at room temperature | 4 | 14 | 4 | 14 |
| Tensile, p.s.i. | 305 | 425 | 90 | 480 |
| Elongation, percent | 180 | 100 | 610 | 240 |
| Cured—15 min. at 212° F. | | | | |
| Tensile, p.s.i. | 1,150 | | 1,040 | |
| Elongation, percent | 90 | | 100 | |

Example 3

To illustrate the importance of maintaining a narrow molecular weight distribution in order to achieve low bulk viscosity polymers and to further demonstrate the necessity of securing polymers having relatively high number average molecular weight levels in order to obtain cured materials having acceptable physical properties, a series of experiments were conducted following the procedure of Example 2 for polymers 6, 7, 8 and 9 and that of the prior art for polymers 1 and 2, wherein chlorinated polymers having differing $\overline{M}_w/\overline{M}_n$ ratios and number average molecular weights were prepared. Each of the polymers were cured for 15 minutes at 212° F. using the recipe of Run 7 of Table III. The results of the tests are set for in Table IV below.

TABLE IV

| Polymer: | Viscosity average molecular weight | $\overline{M}_w/\overline{M}_n$ ratio | Calculated $\overline{M}_n$ by GPC | Bulk viscosity, cps. at 200° F. | Maximum tensile, p.s.i· |
|---|---|---|---|---|---|
| 1 | 55,000 | 4.5 | 12,000 | 4×10⁶ | 1,200 |
| 2 | 40,000 | 4.0 | 10,000 | 1×10⁶ | 800 |
| 3 | 35,000 | 2.0 | 17,000 | 3.5×10⁵ | 1,300 |
| 4 | 17,000 | 1.6 | 10,000 | 4×10⁴ | 700 |
| 5 | 13,000 | 1.5 | 9,000 | 3×10⁴ | 400 |
| 6 | 7,000 | 1.5 | 4,700 | 1×10⁴ | 100 |

The data set forth above indicate that polymers having $\overline{M}_w/\overline{M}_n$ ratios greater than 2.5 have undesirably high bulk viscosities (greater than 1 million centipoises at 200° F.) and hence are not flowable at moderate temperatures. As can be seen by comparing the data for polymers 3 and 4 with that of polymers 1 and 2, the polymers of this invention which have a very narrow molecular weight distribution ($\overline{M}_w/\overline{M}_n$ ratios less than 2.5) exhibit, after curing, tensile properties equivalent to those for materials having wide molecular weight distributions and high bulk viscosities. The very rapid reduction in tensile strength of the cured products when the value of $\overline{M}_n$ is permitted to drop below 10,000 is also shown.

The data also show that the characteristics of bulk viscosity and $\overline{M}_v$ also can completely identify a satisfactory room flowable polymer.

Example 4

To demonstrate the advantages of the organic halide promoted ethyl aluminum dichloride catalyst system of this invention, a series of polymerization experiments were conducted following the procedure of Example 1 wherein a benzyl chloride-ethyl aluminum dichloride system and various other catalysts were used. The amounts of catalyst used were sufficient to secure the maximum level of monomer conversion. The results of the tests are set forth in Table V below.

TABLE V

| Run | Catalyst | Catalyst efficiency, g./g. | Monomer Conversion, percent | Reaction temperature, °C. | Viscosity average molecular wt. ($\overline{M}_w$) | $\overline{M}_w/\overline{M}_n$ |
|---|---|---|---|---|---|---|
| 1 | EtAlCl₂ | 40 | 58 | −56.5 | 46,500 | 4 |
| 2 | EtAlCl₂ | 30 | 68 | −42 | 30,000 | 3.5 |
| 3 | AlCl₃ | 250 | 97 | −42 | 18,000 | 4.0 |
| 4 | AlCl₃ | 320 | 70 | −61 | 81,000 | 6 |
| 5 | EtAlCl₂/benzyl chloride | 100 | 95 | −55 | 35,000 | 2.0 |
| 6 | do | 120 | 95 | −35 | 18,000 | 1.5 |

The data illustrate that a benzyl chloride promoted ethyl aluminum dichloride catalyst system is far superior to an unpromoted ethyl aluminum dichloride system in that both higher catalyst efficiency and monomer conversions are secured with the promoted system. Additionally, with the promoted system the ratios of $\overline{M}_w$ to $\overline{M}_n$ as determined by GPC data are less than 2.5 whereas when the unpromoted system was used polymers having relatively high $\overline{M}_n/\overline{M}_w$ ratios were formed. With the use of an aluminum chloride catalyst system which is commonly employed to initiate isobutylene-isoprene copolymerizations a very high catalyst efficiency results; however, the $\overline{M}_w/\overline{M}_n$ ratio of the copolymers was well in excess of 2.5 indicating that polymers having a wide molecular weight distribution were formed with their use.

While there are above-described a number of specific embodiments of the present invention, it is obviously possible to produce other embodiments of various equivalent modifications and variations thereof without departing from the spirit and scope of the invention.

Having now set forth the general nature and specific embodiments of the present invention, the true scope is now particularly pointed out in the appended claims.

What is claimed is:

1. A room-temperature, flowable, polymer composition capable of being cured into elastomeric materials comprising a copolymer of a minor amount of a $C_4$–$C_6$ conjugated diolefin and a major amount of an isoolefin having the general formula:

$$CH_3-\underset{\underset{R}{|}}{C}=CH_2$$

wherein R is selected from the group consisting of $C_1$–$C_{12}$ acyclic and alicyclic radicals, said copolymer having a bulk viscosity of from 10,000 to 600,000 centipoises at 200° F. and a viscosity average molecular weight ($M_v$) of about 10,000 to about 50,000.

2. The composition of claim 1 wherein said copolymer contains from 1 to 14 wt. percent of chemically combined halogen functionality, said halogen functionality selected from the group consisting of chlorine and bromine.

3. The polymer composition of claim 1 wherein said polymer has a number average molecular weight as determined by gel permeation chromatography of at least 10,000.

4. The polymer composition of claim 1 wherein R is an alkyl radical having from 1 to 6 carbon atoms.

5. The polymer composition of claim 1 wherein said copolymer contains from 10 to 0.5 mole percent isoprene and from 90 to 99.5 mole percent isobutylene.

6. The polymer composition of claim 1 cured to an elastomeric vulcanizate.

7. The polymer composition of claim 2 cured to an elastomeric vulcanizate.

8. A process for the formation of room-temperature, flowable, low-bulk viscosity, curable copolymers from a reaction mixture comprising a conjugated diolefin and an isoolefin which comprises reacting at polymerization conditions a $C_4$–$C_6$ conjugated diolefin with an isoolefin having the general formula:

$$CH_3-\underset{\underset{R}{|}}{C}=CH_2$$

wherein R is selected from the group consisting of $C_1$–$C_{12}$ acyclic and alicyclic radicals, said isoolefin comprising about 70–99.5 wt. percent of the reaction mixture, in the presence of a catalytic amount of a catalyst selected from the group consisting of (1) aluminum bromide and (a) ethyl aluminum dichloride promoted with a compound selected from the group consisting of hydrogen chloride, $C_3$–$C_7$ organic halides, and mixtures thereof.

9. The process of claim 8 wherein said reaction is conducted in a hydrocarbon diluent at a temperature in the range of about −30 to −80° C.

10. The process of claim 9 wherein R is an alkyl radical having from 1 to 6 carbon atoms.

11. The process of claim 10 wherein said isoolefin is isobutylene and said diolefin is isoprene and said catalyst is ethyl aluminum dichloride promoted with a minor amount of benzyl chloride.

12. The process of claim 9 wherein said hydrocarbon diluent is a $C_3-C_8$ hydrocarbon.

13. The polymer composition of claim 1 wherein said polymer has a ratio of weight average molecular weight ($M_w$) to number average molecular weight ($M_n$) as determined by gel permeation chromatography of less than 2.5.

References Cited

UNITED STATES PATENTS

| | | | |
|---|---|---|---|
| 3,023,191 | 2/1962 | Tegge et al. | 260—73 |
| 3,255,154 | 6/1966 | Dudley | 260—78.4 |
| 3,342,789 | 9/1967 | Bannister et al. | 260—79.5 |
| 3,349,065 | 10/1967 | Kennedy (info.) | 260—85.3 |
| 3,356,661 | 12/1967 | Coleman | 260—85.3 |

JAMES A. SEIDLECK, Primary Examiner

R. A. GAITHER, Assistant Examiner

U.S. Cl. X.R.

260—23.7, 41.5, 45.8, 45.9, 683.15